(12) United States Patent
Livneh

(10) Patent No.: US 8,779,013 B2
(45) Date of Patent: Jul. 15, 2014

(54) PROCESS AND APPARATUS FOR CONVERTING GREENHOUSE GASES INTO SYNTHETIC FUELS

(71) Applicant: Ben Zion Livneh, Denver, CO (US)

(72) Inventor: Ben Zion Livneh, Denver, CO (US)

(73) Assignee: Amiren LLC, Denver, CO (US)

( * ) Notice: Subject to any disclaimer, the term of this patent is extended or adjusted under 35 U.S.C. 154(b) by 0 days.

(21) Appl. No.: 13/653,623

(22) Filed: Oct. 17, 2012

(65) Prior Publication Data

US 2013/0096213 A1 Apr. 18, 2013

Related U.S. Application Data

(60) Provisional application No. 61/547,872, filed on Oct. 17, 2011.

(51) Int. Cl.
| | |
|---|---|
| *C07C 27/00* | (2006.01) |
| *C10G 1/00* | (2006.01) |
| *C01B 3/00* | (2006.01) |

(52) U.S. Cl.
USPC ........... 518/700; 518/703; 518/704; 518/715; 208/402; 204/157

(58) Field of Classification Search
USPC ........... 518/700, 703, 704; 208/402; 204/157
See application file for complete search history.

(56) References Cited

U.S. PATENT DOCUMENTS

| | | | | |
|---|---|---|---|---|
| 5,266,175 | A | * 11/1993 | Murphy | 204/157.43 |
| 2012/0024843 | A1 | * 2/2012 | Lissianski et al. | 219/678 |
| 2012/0055851 | A1 | * 3/2012 | Kyle | 208/402 |

* cited by examiner

*Primary Examiner* — Jafar Parsa
(74) *Attorney, Agent, or Firm* — Lathrop & Gage LLP; Anthony J. Janiuk

(57) ABSTRACT

Embodiments of the present invention are directed to apparatus and methods for converting carbon dioxide and/or methane into higher alkanes and hydrogen gas in a single reaction chamber using a catalyst and microwave radiation.

10 Claims, 2 Drawing Sheets

PROCESS AND APPARATUS FOR CONVERTING GREENHOUSE GASES INTO SYNTHETIC FUELS

RELATED APPLICATIONS

This application is a continuation in part of U.S. Provisional Application entitled Process and Apparatus for Steam Methane Reforming, Ser. No. 61/547,872, filed Oct. 17, 2011, the entire contents of which are incorporated by reference.

FEDERAL SPONSORSHIP

Embodiments of the present invention were conceived and developed without Federal aid or sponsorship.

FIELD OF THE INVENTION

Embodiments of the present invention relate to methods and apparatus for converting natural gas and greenhouse gases, carbon dioxide in particular, into useful fuels.

BACKGROUND OF THE INVENTION

There are widespread concerns regarding the increase in carbon dioxide concentration in the atmosphere and the association of such concentration to climate change. The increase in concentration of carbon dioxide in the atmosphere has led to the imposition of new limitations on key sources of carbon dioxide. In parallel, major international efforts have begun to search for a viable solution to the large amounts of carbon dioxide that are produced, and will continue to be created by industry in the near future. In the U.S. alone, 6 billion tons of carbon dioxide are produced annually, and will continue to be produced in the foreseeable future.

It would be desirable to produce methods and apparatus for consuming carbon dioxide to remove the gas from the atmosphere to reduce its effect on climate change. It would also be desirable to produce methods and apparatus to convert the low value and widely-available natural gas into higher value hydrocarbons as a feedstock to oil refineries as a replacement to imported oil.

BRIEF SUMMARY OF THE INVENTION

Embodiments of the present invention feature methods and apparatus for consuming carbon dioxide and/or converting methane to higher value hydrocarbons and/or hydrogen gas. The methods and apparatus use energy, and can be coupled to green energy sources or excess energy to create and store higher value energy compositions.

One embodiment of the present invention is directed to an apparatus for producing a product comprising at least one of the group of hydrocarbon having a formula $C_nH_z$, where n is a positive integer greater than 1, and z is a positive integer between 2n+2 and 2n hydrogen gas. The apparatus comprises a reaction vessel for containing a reaction mixture of a gaseous carbon source represented by the letter W, selected from the group consisting of natural gas, $CH_4$ and $CO_2$, and water ($H_2O$), and having a catalyst and at least one microwave energy source. The reaction mixture, in the presence of the catalyst and thermal energy, undergoes at least one reaction comprising:

wherein W comprises at least n carbon molecules and n is a positive integer greater than 1, and z is a positive integer between 2n+2 and 2n. The carbon source comprises at least some $CH_4$, and Y is zero or a positive integer to balance the hydrogen. The catalyst is selected from the group of iron, cobalt, copper and nickel containing compounds which upon microwave radiation increase in temperature to produce thermal energy required for the reaction, while also enable the chemistry. The microwave source is in radiation communication with the vessel for placing thermal energy to the iron-based catalyst and to the reaction mixture to produce at least one hydrocarbon composition having a formula $C_nH_z$, and hydrogen gas.

The reactions of the present invention do not necessarily produce one singular hydrocarbon but can and do produce one or more alkane compositions and alkenes compositions, saturated and unsaturated. The mixture of hydrocarbons can be subjected to further refining steps known in the art. The relative ratios of hydrogen gas and hydrocarbons and the nature of the hydrocarbons can be controlled by the carbon source, the composition of the catalyst and reaction parameters. As used herein, the term "higher alkane" refers to an alkane and alkenes having two or more carbon atoms.

Embodiments of the apparatus feature a catalyst selected from the group of magnetite, pyrrhotite and chalcopyrite, in a mixture with a catalyst selected from a group of nickel, copper and cobalt. The catalyst is held as a packed or fluidized bed within the reaction vessel.

One embodiment of the present invention features an apparatus wherein the reaction vessel has at least one output conduit for the removal of the hydrocarbon composition product in a continuous process. And, one embodiment features a reaction vessel having at least one reactant input conduit for placing the carbon source and $H_2O$ into the reaction vessel as the carbon source and $H_2O$ are consumed in the reaction to facilitate a continuous process. The at least one reactant input conduit and one output conduit are used to fluidize the catalyst where the catalyst is maintained as a fluidized bed.

The microwave energy source is in the nature of a window transparent to microwave emissions. The microwave window is in transmission communication with a microwave emitter. One embodiment of the present apparatus features a microwave energy source powered by excess electrical capacity of an electric power plant. Another embodiment features a microwave energy source powered by one of more green power sources. As used herein, the term "green power source" refers to electrical power sources that do not consume carbonaceous fuels such as wind energy, solar energy, geothermal energy, and hydrodynamic energy, such as tidal or hydro-electric sources.

A further embodiment of the present invention is directed to a method of producing a product comprising at least one of the group of hydrocarbon having a formula $C_nH_z$ where n is a positive integer greater than 1, and z is an integer between 2n+2 and 2n, and hydrogen gas. The method comprises the steps of forming a reaction mixture of a gaseous carbon source represented by the letter W, selected from the group consisting of natural gas or $CH_4$ and $CO_2$, and $H_2O$ in a reaction vessel having a catalyst and at least one microwave energy source. The reaction mixture in the presence of the catalyst and thermal energy undergoes at least one reaction comprising:

wherein W comprises at least n carbon molecules and n is a positive integer greater than 1, and z is a positive integer between 2n+2 and 2n. The carbon source comprises at least some $CH_4$, and Y is zero or a positive integer to balance the hydrogen. The catalyst is selected from the group of iron-containing compounds which upon microwave radiation increase in temperature to produce thermal energy, and other catalyst metals selected from nickel, copper or cobalt. The method further comprises the step of placing thermal energy to the iron-based catalyst by the microwave source and to the reaction mixture to produce at least one product comprising a hydrocarbon composition having a formula $C_nH_z$, and hydrogen gas.

One method features a catalyst selected from the group of magnetite ($Fe_3O_4$), pyrrhotite (FeS) and chalcopyrite ($CuFeS_2$). The catalyst is held as a packed or fluidized bed in the reaction vessel.

One method features a continuous process wherein the hydrocarbon composition is removed from the reaction vessel after formation and the carbon source and $H_2O$ are added to the reaction vessel as the carbon source and $H_2O$ are consumed in the reaction.

One method features a microwave energy source powered by excess electrical capacity of an electric power plant and/or green energy sources, such as wind energy, solar energy, hydrodynamic energy, or geothermal energy.

These and other features and advantages of the present invention will be apparent to those skilled in the art upon viewing the drawings and reading the text that follows.

DETAILED DESCRIPTION OF THE INVENTION

Embodiments of the present invention will be described in detail with respect what is understood to be the best mode. However, improvements and modifications may change the perception of the best mode over time. Further, as will be readily understood by those skilled in the art, the present invention is subject to modification and alteration without departing from the teaching herein. Therefore, the present description is exemplary and should not be considered limiting.

Embodiments of the present invention feature methods and apparatus for consuming carbon dioxide and/or converting methane to higher alkanes. Carbon dioxide is considered a greenhouse gas contributing to global warming. Hydrogen gas is considered a cleaner fuel and is likely to become of greater importance over time. The methods and apparatus use energy and can be coupled to green energy sources or excess energy to create and store higher value energy compositions.

Figure 1:
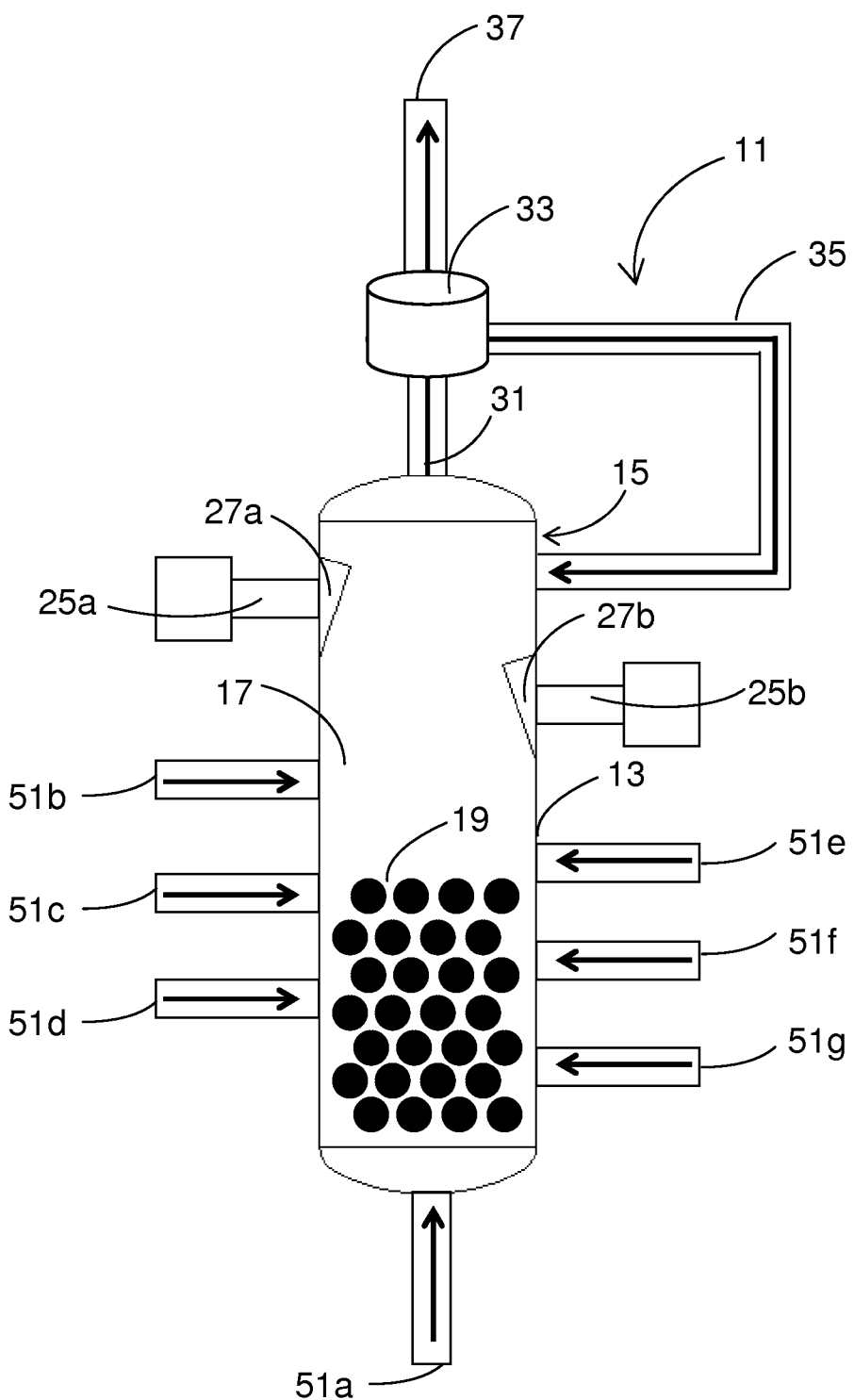
FIG. 1 depicts an apparatus embodying features of the present invention.

Turning now to FIG. 1, one embodiment of the present invention, directed to an apparatus, generally designated by the numeral 11, for producing a product, comprising at least one of the group of hydrocarbon having a formula $C_nH_z$, where n is a positive integer greater than 1, and z is an integer between 2n+2 and 2n, and hydrogen gas. The apparatus 11 has a reaction vessel 13 having one or more walls 15 creating a chamber 17.

Figure 2:
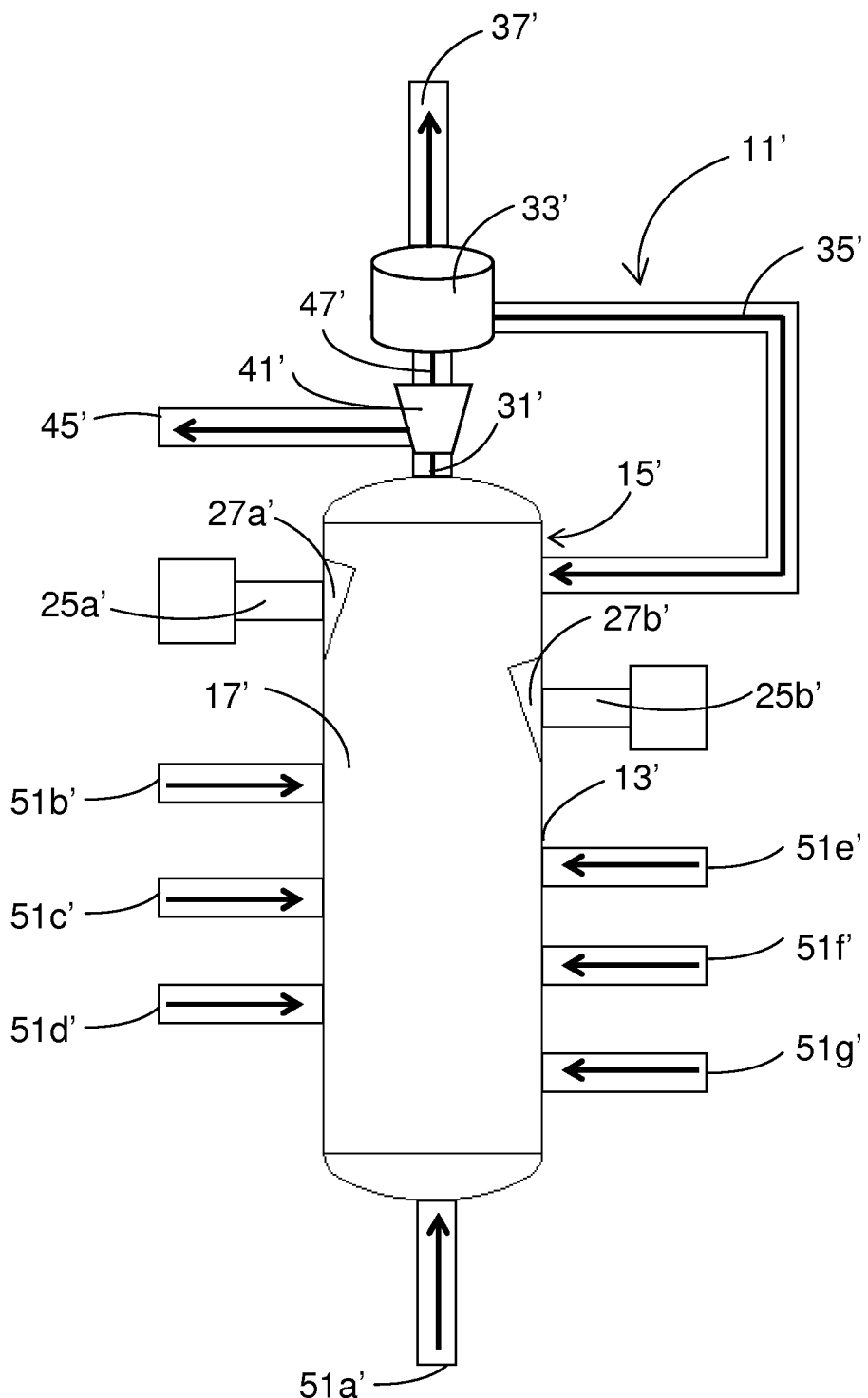
FIG. 2 depicts an apparatus embodying features of the present invention.

The chamber 17 contains a catalyst in a fixed catalyst bed 19. FIG. 2 depicts a similar apparatus 11' in which like components are similarly labeled. FIG. 2 depicts an apparatus 11' having a reaction vessel 13' having one or more walls 15' creating a chamber 17'. The chamber 17' contains a fluidized catalyst [not shown]. The fluidized catalyst is comprised of small particles suspended in the flow of gases moving through chamber 17' in a generally upward motion.

The chamber 11 and the chamber 11', referring to both FIGS. 1 and 2, are for containing a reaction mixture of a gaseous carbon source represented by the letter W, selected from the group consisting of $CH_4$ and $CO_2$, and $H_2O$. Methane is a major hydrocarbon of natural gas. The reaction mixture, in the presence of the catalyst and thermal energy, undergoes at least one reaction, which is described generally in Reaction 1, set forth below:

$$W \rightarrow C_nH_z + yH_2 \qquad \text{Reaction 1.}$$

wherein W comprises at least n carbon molecules and n is a positive integer greater than 1, and z is an integer between 2n+2 and 2n. The carbon source comprises at least some $CH_4$, and Y is zero or a positive integer to balance the hydrogen. Although presented as a single reaction above, this reaction may take place as a series of steps and represent a generalized summary of the reactions taking place in chamber 11 and chamber 11'.

The conversion of the methane gas content in the natural gas to carbon monoxide (CO) and hydrogen ($H_2$) is known as Steam Methane Reforming (SMR), set forth below as Reaction 2:

$$CH_4 + H_2O \rightarrow CO + 3H_2 \qquad \text{Reaction 2.}$$

Reaction 2 is an endothermic reaction, which occurs at high temperatures of approximately 1,000 degrees Celsius and utilizes a nickel catalyst.

The conversion of CO and $H_2$ to hydrocarbons is thought to proceed through a Fischer-Tropsch (FT) Synthesis, which can be expressed as set forth below:

$$mCO + (2m+1)H_2 \rightarrow C_mH_{2m+2} + mH_2O \qquad \text{Reaction 3.}$$

where m is a positive integer.

Reaction 3 is an exothermic reaction, occurring at high temperatures and pressures, utilizing an iron-based catalyst.

The conversion of carbon dioxide to carbon monoxide is thought to proceed in a Water Gas Shift Reaction (WGSR) which can be expressed in Reaction 4 as follows:

$$CO_2 + H_2 \rightarrow CO + H_2O \qquad \text{Reaction 4.}$$

Reaction 4 is also endothermic. This reaction converts carbon dioxide and hydrogen gas to water and carbon monoxide. Carbon monoxide is one reactant in the FT Synthesis. Hydrogen gas is another reactant in the FT Synthesis and is a product of SMR reactions.

The catalyst, depicted as a fixed bed 19 or as a fluidized bed of small particles, 1000 microns or smaller that can not be readily drawn in the apparatus 11' of FIG. 2, is selected from the group of iron-containing compounds which upon microwave radiation increase in temperature to produce thermal energy. Chalcopyrite under microwave radiation exhibits an increase in temperature at a rate of over 900° C. per minute. The catalyst is selected from the group of iron-containing compounds, magnetite, pyrrhotite and chalcopyrite. In fluidized bed applications such as depicted in FIG. 2, the catalyst is rendered into particles which can be substantially airborne in an updraft of reaction gases and/or inert flue gases. The reaction gases and catalyst particles have a ratio of 10:1 reaction gases to catalyst particles by volume in one embodiment. In another embodiment, the gases to catalyst particles ratio will be different to produce the desired reactor's performance.

In fixed bed applications as depicted in FIG. 1, the catalyst is maintained as larger non-moving blocks, beads, rings, tiles, open solid structures in the nature of a honeycomb, or the like known in the art. The catalyst can be incorporated or embedded into carriers such as ceramics, glass or the like.

The apparatus 11 and apparatus 11' have a microwave energy source, of which two are shown in each FIGS. 1 and 2, designated 25a and 25b in FIGS. 1 and 25a' and 25b' in FIG. 2. Each microwave source 25a, 25b, 25a' and 25b' is in radiation communication with the respective chambers 17 and 17' of vessels 13 and 13' for placing microwave energy to the catalyst which in turn converts it to thermal energy to energize the reaction mixture. That is, the catalyst absorbs the microwave energy and heats up to reaction temperatures.

Each microwave energy source 25a, 25b, 25a' and 25b' comprises a microwave window 27a, 27b, 27a' and 27b' respectively, coupled to a microwave emitter [not shown]. Microwave emitters of an industrial nature and size are known in the art. In the presence of the catalyst irradiated with microwave energy, the reactants form at least one hydrocarbon composition having a formula $C_nH_z$ where n is a positive integer equal to or greater than 1, where n is equal to 1 only where the carbon source is carbon dioxide, and z is an integer between 2n+2 and 2n, and hydrogen gas.

The reactions of the present invention do not necessarily produce one singular hydrocarbon but can and do produce one or more alkane and alkene compositions. The mixture of alkanes can be subjected to further refining steps known in the art. The relative ratios of hydrogen gas and alkanes and the nature of the alkanes can be influenced or controlled by the carbon source, reaction parameters and the introduction of other compounds to shift the reactions in favor of a desired end product.

Apparatus 11 and apparatus 11' operate as a continuous process with at least one output conduit 31 and 31' respectively, in fluid communication with respective chambers 17 and 17' for the removal of the alkane composition product. Turning now to FIG. 1, the output conduit 31 is in communication with a separation vessel 33. Separation vessel 33 separates the reactants which failed to form product and redirects such reactants via a recycle conduit 35 back to chamber 17. Recycle conduit 35 is thus in fluid communication with the separation vessel 33 and the chamber 17. Apparatus 11 further comprises a product conduit 37 in fluid communication with the separation vessel 33 to remove the hydrocarbon product to storage [not shown] or further processing apparatus [not shown] such as refining apparatus.

Turning now to FIG. 2, apparatus 11' has a outlet conduit 31' in fluid communication with chamber 17' and a cyclone vessel 41'. Cyclone vessel 41' separates the particulate catalyst forming the fluidized bed carried up and through the outlet conduit 31' by the flow of product and un-reacted gases. The apparatus 11' further comprises a catalyst recycle conduit 45' in fluid communication with the cyclone vessel 41' to receive particulate catalyst and direct such catalyst to the chamber 17' to be described below.

Apparatus 11' has a separation conduit 47' in fluid communication with the cyclone vessel 41' and separation vessel 33'. Separation vessel 33' performs in the manner of the separation vessel 33 described with respect to apparatus 11 to separate product alkanes from reactants which failed to form product and such reactants via recycle conduit 35' to the chamber 17'. Recycle conduit 35' is thus in fluid communication with the separation vessel 33' and the chamber 17'. Product conduit 37' is in fluid communication with the separation vessel 33' to remove product alkane as it is formed and carried upward. The product alkane can be further processed and refined by refining apparatus [not shown].

Turning now to both FIGS. 1 and 2, apparatus 11 and apparatus 11' each have at least one reactant input conduit, of which seven are depicted, 51a-g and 51a-g' respectively, in fluid communication with respective chambers 17 and 17' of the reaction vessels 13 and 13'. Now, with a focus on FIG. 1, chamber 17 receives the carbon source, such as methane, via input conduit 51a. Chamber 17 receives carbon source, such as carbon dioxide, via input conduits 51b-d. Chamber 17 receives water in the form of steam via input conduit 51e. Chamber 17 receives controlling reactants, such as hydrogen gas, via input conduit 51f and oxygen via input conduit 51g.

Similarly, with a focus on FIG. 2, chamber 17' receives the carbon source, such as methane, and catalyst particles via input conduit 51a'. The particles are swept up by the updraft of the carbon source and distributed throughout the chamber 17', held in suspension by the movement of gases. Chamber 17' receives the carbon source, such as carbon dioxide, via input conduits 51b-d'. Chamber 17' receives water in the form of steam via input conduit 51e'. Chamber 17' receives controlling reactants, such as hydrogen gas, via input conduit 51f' and oxygen via input conduit 51g'.

The addition of hydrogen gas via the input conduits 51f and 51f' in apparatus 11 and apparatus 11' respectively, shifts the reaction to the formation of alkanes and the conversion of carbon dioxide where carbon dioxide is a carbon source. The source of the hydrogen gas can be hydrogen gas saved during processes which generate such gas which is then stored for such use, or from other sources. Similarly, the input of oxygen in the system promotes the formation of carbon monoxide, which again favors the formation of hydrogen gas or alkanes.

The carbon dioxide gas is sourced from large producers such as power generating plants, industrial systems such as cement, lime and steel producers, and any large source of carbon dioxide gas. Apparatus 11 reduces the carbon footprint of installations such as coal fired power plants to improve their environmental performance and secure their future as a reliable and inexpensive source of electricity.

Carbon dioxide gas conduits 51a and 51a' in apparatus 11 and apparatus 11' respectively, can carry pure carbon dioxide gas, and can carry carbon dioxide in a mixture of gases containing various mixture ratios, such as in the case of power utility flue gas. Flue gases contain, apart from carbon dioxide, other gases such as water vapors, carbon monoxide and nitrogen gas.

The apparatus 11 and apparatus 11' feature a microwave energy source 25a, 25b, 25a' and 25b' respectively, powered by excess electrical capacity of an electric power plant or by one of more green power sources. As used herein, the term "green power source" refers to electrical power sources that do not consume carbonaceous fuels such as wind energy, solar energy, geothermal energy, and hydrodynamic energy, such as tidal or hydroelectric sources. The apparatus 11 and apparatus 11' allow the use of green power sources to store energy in upgraded materials for later consumption.

The operation of the apparatus 11 and apparatus 11' will now be described with respect to a method of producing a product comprising at least one of the group of hydrocarbon having a formula $C_nH_z$, where n is a positive integer greater than 1, and z is an integer between 2n+2 and 2n, and hydrogen gas. The method comprises the steps of forming a reaction mixture of a gaseous carbon source represented by the letter W, selected from the group consisting of $CH_4$ and $CO_2$, and $H_2O$ in reaction vessels 13 or 13' having, as depicted in FIG. 1, a catalyst 19 and at least one microwave energy source 25a, 25b, 25a' and 25b' respectively. The reaction mixture in the presence of the catalyst and thermal energy undergoes at least one reaction comprising:

$$W \rightarrow C_nH_z + yH_2;$$

wherein W comprises at least n carbon molecules and n is a positive integer greater than 1, and z is an integer between 2n+2 and 2n. The carbon source comprises at least some $CH_4$, and Y is zero or a positive integer to balance the hydrogen. The catalyst is selected from the group of iron-, nickel-, copper- and cobalt-containing compounds where at least one selected catalyst composition upon microwave radiation increases in temperature to produce thermal energy. The method further comprises the step of placing thermal energy to the catalyst by the microwave source 25a, 25b, 25a' and 25b' and to the reaction mixture to produce at least one product comprising an alkane.

Thus, embodiments of the present invention have been described with respect to the best mode with the understanding that such embodiments are subject to modification and alterations without departing from the teaching herein. Therefore, the present invention should not be limited to the precise details presented herein but should encompass the subject matter of the claims that follow and their equivalents.

The invention claimed is:

1. A method of producing at least one product comprising a hydrocarbon having a formula $C_nH_z$, where n is a positive integer greater than 1, and z is an integer between 2n+2 and 2n, and hydrogen gas comprising the steps of:

forming a reaction mixture of a gaseous carbon source represented by the letter W, selected from the group consisting of $CH_4$ and $CO_2$ from the atmosphere, and $H_2O$ in a reaction vessel having a catalyst and at least one microwave energy source, said reaction mixture in the presence of said catalyst and thermal energy undergoing at least one reaction comprising:

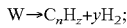

$W \rightarrow C_nH_z + yH_2$;

wherein W comprises at least n carbon molecules and n is a positive integer greater than 1, and z is an integer between 2n+2 and 2n, the carbon source comprises at least some $CH_4$, and Y is zero or a positive integer to balance the hydrogen; said catalyst is selected from the group of iron-, cobalt-, copper- and nickel-containing compounds where at least one selected catalyst upon microwave radiation increases in temperature to produce thermal energy;

placing thermal energy to the catalyst by said microwave energy source and to said reaction mixture to produce at least one product selected from the group consisting of a hydrocarbon composition having a formula $C_nH_z$, and hydrogen gas.

2. The method of claim 1 wherein said catalyst is selected from the group of magnetite, pyrrhotite and chalcopyrite.

3. The method of claim 1 wherein said catalyst is held as a packed or fluidized bed.

4. The method of claim 1 wherein said hydrocarbon composition is removed from the reaction vessel in a continuing process.

5. The method of claim 1 wherein said carbon source and $H_2O$ are added to the reaction vessel as the carbon source and $H_2O$ are consumed in the reaction.

6. The method of claim 1 wherein said microwave energy source is powered by excess electrical capacity of an electric power plant.

7. The method of claim 1 wherein said microwave energy source is powered by one of more non-carbon sources.

8. The method of claim 7 wherein said non-carbon source is wind energy.

9. The method of claim 7 wherein said non-carbon source is solar energy.

10. The method of claim 7 wherein said non-carbon source is hydrodynamic or geothermal energy.

* * * * *